United States Patent
Yoshida et al.

(10) Patent No.: US 8,188,702 B2
(45) Date of Patent: May 29, 2012

(54) ROTATING ELECTRICAL MACHINE CONTROL SYSTEM AND VEHICLE DRIVE SYSTEM

(75) Inventors: Takashi Yoshida, Anjo (JP); Subrata Saha, Anjo (JP); Daisuke Ogino, Anjo (JP); Jin Izawa, Obu (JP); Yoshinori Ono, Nukata-gun (JP)

(73) Assignee: Aisin AW Co., Ltd., Anjo (JP)

( * ) Notice: Subject to any disclaimer, the term of this patent is extended or adjusted under 35 U.S.C. 154(b) by 470 days.

(21) Appl. No.: 12/458,127

(22) Filed: Jul. 1, 2009

(65) Prior Publication Data

US 2010/0026217 A1    Feb. 4, 2010

(30) Foreign Application Priority Data

Jul. 31, 2008    (JP) ................... 2008-198567

(51) Int. Cl.
*H02P 27/04* (2006.01)
(52) U.S. Cl. .................. 318/802; 318/811; 318/800
(58) Field of Classification Search .............. 318/802, 318/811, 800, 808, 778, 722, 413, 416, 440, 318/459
See application file for complete search history.

(56) References Cited

U.S. PATENT DOCUMENTS

| | | | |
|---|---|---|---|
| 5,883,484 A | 3/1999 | Akao | |
| 7,133,602 B2 | 11/2006 | Yamada | |
| 2004/0165868 A1 | 8/2004 | Sato et al. | |
| 2007/0108936 A1 | 5/2007 | Yaguchi | |
| 2009/0021200 A1 | 1/2009 | Yaguchi | |
| 2011/0160806 A1* | 6/2011 | Lyden et al. | 607/63 |

FOREIGN PATENT DOCUMENTS

| | | |
|---|---|---|
| JP | A-10-66383 | 3/1998 |
| JP | A-2004-80998 | 3/2004 |
| JP | A-2005-210779 | 8/2005 |
| JP | A-2007-221920 | 8/2007 |
| JP | A-2007-300799 | 11/2007 |
| JP | A-2008-114614 | 5/2008 |
| WO | WO 03/015254 A1 | 2/2003 |
| WO | WO 2005/081395 A1 | 9/2005 |
| WO | WO 2007/126038 A1 | 11/2007 |

* cited by examiner

*Primary Examiner* — Karen Masih
(74) *Attorney, Agent, or Firm* — Oliff & Berridge, PLC (57) ABSTRACT

A rotating electrical machine control system includes a frequency converting portion that is interposed between a rotating electrical machine for driving a vehicle and a DC power source for supplying electric power to the rotating electrical machine, and that converts an output of the DC power source to an AC output at least during a powering operation of the rotating electrical machine; a voltage converting portion that is interposed between the DC power source and the frequency converting portion, and that boosts the output of the DC power source based on a boost command value which is set according to a target torque and a rotational speed of the rotating electrical machine; and a control portion for controlling the frequency converting portion and the voltage converting portion.

8 Claims, 6 Drawing Sheets

ROTATING ELECTRICAL MACHINE CONTROL SYSTEM AND VEHICLE DRIVE SYSTEM

CROSS-REFERENCE TO RELATED APPLICATION

The disclosure of Japanese Patent Application No. 2008-198567 filed on Jul. 31, 2008 including the specification, drawings and abstract is incorporated herein by reference in its entirety.

BACKGROUND

The present invention relates to a rotating electrical machine control system that includes a power supply converting portion for boosting an output of a DC (direct current) power source, and that controls a rotating electrical machine for driving a vehicle. Moreover, the present invention relates to a vehicle drive system including the rotating electrical machine control system.

In recent years, there have been proposed automobiles having a smaller environmental burden than automobiles which are driven by an internal combustion engine in which fossil fuel is combusted. Examples of such automobiles include electric cars driven by a motor as a rotating electrical machine, and hybrid cars driven by an internal combustion engine and a motor. Motors which are mounted on the electric cars and the hybrid cars are expected to provide a desirable torque suitable for driving a passenger car over a wide speed range (rotational-speed range).

A motor as a rotating electrical machine (a motor and a generator) operates based on a principle of generating a force (torque) by a magnetic field and a current. However, during rotation of the motor, the force is applied in the magnetic field, causing a so-called counter electromotive force. The counter electromotive force is generated in a direction that prevents the current flow which generates the torque. This reduces the current flowing in the magnetic field for rotating the motor, thereby reducing the force (torque). The counter electromotive force increases as the rotational speed of the motor increases. Thus, when the rotational speed reaches a certain value, a current generated by the counter electromotive force reaches a driving current, and the motor cannot be controlled. Therefore, "field-weakening control" is performed in order to reduce the force of a field magnet generating the magnetic field and thus to suppress generation of the counter electromotive force. However, since the field-weakening control reduces the force of the field magnet, the intensity of the magnetic field is also reduced, resulting in reduction of the maximum torque obtained. Moreover, reduction in efficiency due to increased losses has also been pointed out.

In view of this problem, Japanese Patent Application Publication No. JP-A-H10-66383 (paragraphs 3 to 12, FIGS. 1 and 2, and the like) proposes a technique of boosting a battery voltage for supplying driving electric power to a motor in order to shift the rotational speed at which shifting to the field-weakening control is performed to a higher rotational speed. According to this technique, the battery voltage is boosted by a booster circuit (converter) according to the position of a target operating point of the motor which is set according to the torque and the rotational speed. This enables a region where the field-weakening control is performed to be shifted to a higher output side (a higher torque side and a higher rotational speed side). In the example described in Japanese Patent Application Publication No. JP-A-H10-66383, a region where normal field control (typically, maximum torque control) without performing the field-weakening control is increased stepwise by setting a plurality of stages of boosted voltage values.

When the boosting operation is started, an input voltage target value of an inverter which is calculated according to a rotational speed and a target torque of a rotating electrical machine, that is, an output voltage of the booster circuit (converter), is controlled by PWM (Pulse Width Modulation) or the like, as described in Japanese Patent Application Publication No. JP-A-2005-210779 (paragraphs 55 to 59 and the like) and PCT International Patent Application Publication No. WO 2003/015254 (claim 1 and the like). The boosted voltage follows a required voltage in a desirable manner.

SUMMARY

On the other hand, when the boosting operation is started from a non-boosting state, that is, from a state where the battery voltage is an input voltage to the inverter for driving the motor, PWM switching control is started for switching elements of the converter which have been fixedly controlled in the non-boosting state. At this time, a dead time, during which both high-side and low-side switching elements of the converter are turned off, is set in order to reliably prevent short-circuit of the converter. This dead time produces a region where the boosting operation cannot be performed in a predetermined voltage range from the battery voltage in a situation where a boost target value is increasing. Therefore, the boosting operation cannot be started until the predetermined voltage is exceeded, and the boosted voltage rapidly increases when the boosting operation is started. In such a situation where the boosted voltage changes rapidly, a response delay is generated due to the transmission time for a control device to obtain a measured boosted voltage, the computation time in the control device, and the like. Due to the response delay, a rotating electrical machine is drivingly controlled on the assumption that a voltage lower than an actual voltage is applied. Since the actually applied voltage is higher than the measured voltage value which is recognized by the control device, the rotating electrical machine outputs a higher torque than a target torque. As a result, current consumption of the rotating electrical machine increases unnecessarily, and a large amount of current including this increase in current consumption is drawn from the battery. In other words, if the voltage boosted by the converter rapidly increases in the state where the rotating electrical machine is being operated with a high torque and the battery power consumption is large, an excessive amount of current may be drawn from the battery, causing an overcurrent. Even if the torque limitation is performed using the technique of Japanese Patent Application Publication No. JP-A-2005-210779, it is not sufficient because it does not consider the delay time such as the transmission time of the measured boosted voltage.

The present invention has been developed in view of the above problems, and it is an object of the present invention to provide a technique of suppressing generation of an overcurrent in a DC power source due to a transient voltage increase caused at the beginning of a boosting operation, in a rotating electrical machine control system having a power supply converting portion for boosting an output of the DC power source.

In order to achieve the above object, a characteristic structure of a rotating electrical machine control system according to a first aspect of the present invention is in that a rotating electrical machine control system includes: a frequency converting portion that is interposed between a rotating electrical machine for driving a vehicle and a DC power source for supplying electric power to the rotating electrical machine, and that converts an output of the DC power source to an AC output at least during a powering operation of the rotating electrical machine; a voltage converting portion that is interposed between the DC power source and the frequency converting portion, and that boosts the output of the DC power source based on a boost command value which is set according to a target torque and a rotational speed of the rotating electrical machine; and a control portion for controlling the frequency converting portion and the voltage converting portion, and when the control portion performs a control to shift a control state from non-boost control, in which the output of the DC power source is supplied to the frequency converting portion through the voltage converting portion without being boosted, to boost control, in which the output of the DC power source is boosted by the voltage converting portion and then supplied to the frequency converting portion, on a condition that the target torque and the rotational speed of the rotating electrical machine exceed a predetermined shift boundary which is set based on a correlation between the target torque and the rotational speed of the rotating electrical machine, boostable electric power, which is electric power obtained by subtracting increased electric power transiently produced during the shifting, from allowable electric power which can be output from the DC power source, is used as reference electric power, and the shift boundary is set in a region where power consumption of the rotating electrical machine is equal to or lower than the boostable electric power.

According to this characteristic structure of the first aspect, the boostable electric power, which is the electric power obtained by subtracting increased electric power transiently produced during shifting from the non-boost control to the boost control, from allowable electric power, is used as reference electric power, and the shift boundary is set in a region where power consumption of the rotating electrical machine does not exceed the boostable electric power. Therefore, the power consumption of the rotating electrical machine does not exceed the allowable electric power even if the increased electric power is transiently produced during shifting from the non-boost control to the boost control. An overcurrent of the DC power source can thus be suppressed in a desirable manner.

It is preferable that the shift boundary of the rotating electrical machine control system according to the first aspect of the present invention be set according to a maximum value of the target torque.

Power consumption of the rotating electrical machine increases as the target torque increases. Thus, the difference between the allowable electric power and the power consumption decreases as the target torque increases. Moreover, the increased electric power that is transiently produced increases as the target torque increases. When the target torque has a maximum value, the increased electric power has the largest value among possible values. In other words, the total power consumption, that is, the sum of the power consumption and the increased electric power, has a maximum value when the target torque has a maximum value. According to the characteristic of the present invention, the shift boundary is set so that the total power consumption does not exceed the allowable electric power even if the total power consumption has a maximum value. Thus, generation of an overcurrent of the DC power source, associated with a transient voltage increase produced at the beginning of a boosting operation, can be reliably suppressed regardless of the target torque.

It is preferable that the boostable electric power of the rotating electrical machine control system according to the first aspect of the present invention be set as electric power obtained by subtracting the increased electric power generated when the target torque has a maximum value, from the allowable electric power.

As described above, when the target torque has a maximum value, the increased electric power has the largest value among possible values. Thus, the boostable electric power obtained by subtracting the increased electric power from the allowable electric power has a minimum value when the target torque has the maximum value. Since the shift boundary is set based on the boostable electric power, generation of an overcurrent of the DC power source, associated with a transient voltage increase produced at the beginning of a boosting operation, can be reliably suppressed regardless of the magnitude of the target torque.

It is preferable that the shift boundary be set to a lower electric power side as the target torque increases.

As described above, the power consumption of the rotating electrical machine increases as the target torque increases. Thus, the difference between the allowable electric power and the power consumption decreases as the target torque increases. Moreover, the increased electric power that is transiently produced increases as the target torque increases. In other words, the total power consumption, that is, the sum of the power consumption and the increased electric power, increases as the target torque increases. Since the shift boundary is set to the lower electric power side as the target torque increases, the power consumption when the increased electric power is added can be reduced, whereby the total power consumption can be suppressed. As a result, generation of an overcurrent of the DC power source, associated with a transient voltage increase produced at the beginning of a boosting operation, can be suppressed in a desirable manner.

In the rotating electrical machine control system according to the first aspect of the present invention, it is preferable that the boostable electric power be set to a higher value as the target torque decreases, while electric power obtained by subtracting the increased electric power generated when the target torque has a maximum value, from the allowable electric power be set as a minimum value of the boostable electric power.

As described above, as the target torque increases, the power consumption of the rotating electrical machine increases, and the increased electric power that is transiently produced increases. When the target torque has a maximum value, the increased electric power has the largest value among possible values. Thus, the boostable electric power obtained by subtracting the increased electric power from the allowable electric power has a minimum value when the target torque has the maximum value. On the other hand, as the target torque decreases from the maximum value, the increased electric power decreases, and thus, the boostable electric power can have a higher value accordingly. When the boostable electric power is set to a higher value as the target torque decreases, while the electric power obtained by subtracting the increased electric power generated when the target torque has the maximum value, from the allowable electric power is set as a minimum value of the boostable electric power, the shift boundary is set according to the target torque without performing an unnecessary boosting operation in a state where the target torque is low. Thus, switching losses and the like associated with the unnecessary boosting operation can be suppressed, and generation of an overcurrent of the DC power source, associated with a transient voltage increase produced at the beginning of a boosting operation, can be suppressed in a desirable manner.

The rotating electrical machine control system according to the first aspect of the present invention is preferably applied in the case where the voltage converting portion includes a reactor having a first end connected to the DC power source, an upper-stage switching element connecting a second end of the reactor and a positive side of the frequency converting portion, and a lower-stage switching element connecting the second end of the reactor and a negative side of the frequency converting portion, and the increased electric power is transiently produced upon shifting from the non-boost control to the boost control due to a dead time during which both the upper-stage switching element and the lower-stage switching element are controlled to be turned off.

Structuring the voltage converting portion as described above enables a booster circuit to be implemented with a simple structure. When the voltage converting portion is structured as described above, the dead time is provided in order to prevent both the upper-stage and lower-stage switching elements of the voltage converting portion from being turned on upon shifting from the non-boost control to the boost control, and thus, to reliably prevent short-circuit between the positive side and the negative side. Therefore, providing the dead time can suppress failures of the rotating electrical machine control system in a desirable manner. However, since no boosting operation can be performed during the dead time, the boosting operation cannot be performed in a predetermined voltage range according to an individual system during the dead time. In other words, the output of the voltage converting portion rapidly and significantly increases beyond this voltage range upon shifting from the non-boost control to the boost control. A response delay of the frequency converting portion or the like to such a rapid voltage increase may transiently generate increased electric power, and a large current may be drawn from the DC power source, causing an overcurrent. However, since the shift boundary is set in view of the increased electric power caused by the dead time, generation of an overcurrent can be suppressed in a desirable manner.

A vehicle drive system according to a second aspect of the present invention may be structured so as to include: the rotating electrical machine control system of the present invention as described above; a first rotating electrical machine and a second rotating electrical machine as the rotating electrical machine; and a power distribution mechanism for distributing a driving force generated from a drive source other than the first rotating electrical machine and the second rotating electrical machine, wherein one of the driving force distributed by the power distribution mechanism is transmitted to a wheel, another one of the driving force distributed by the power distribution mechanism is transmitted to the first rotating electrical machine, and a driving force generated by the second rotating electrical machine is transmitted to the wheel.

The vehicle drive system of this structure can implement a hybrid vehicle that includes a pair of rotating electrical machines, and a drive source (e.g., engine) other than the pair of rotating electrical machines, and that performs so-called split power distribution. This hybrid vehicle can implement operation of the pair of rotating electrical machines in such a manner that satisfies the rotational speed and the torque required for the rotating electrical machines. Moreover, this hybrid vehicle can easily implement a system structured so that respective voltages required for the pair of rotating electrical machines are obtained by a single voltage converting portion.

Moreover, in the vehicle drive system according to the second aspect of the present invention, it is preferable that the power distribution mechanism include a planetary gear mechanism having a first rotary element, a second rotary element, and a third rotary element in order of a rotational speed, the first rotating electrical machine be connected to the first rotary element, the drive source other than the rotating electrical machines be connected to the second rotary element, and the second rotating electrical machine and the third rotary element be connected to the wheel.

By using this structure, a hybrid vehicle performing split power distribution can be easily implemented by using a single planetary gear mechanism.

DETAILED DESCRIPTION OF EMBODIMENTS

Figure 1:
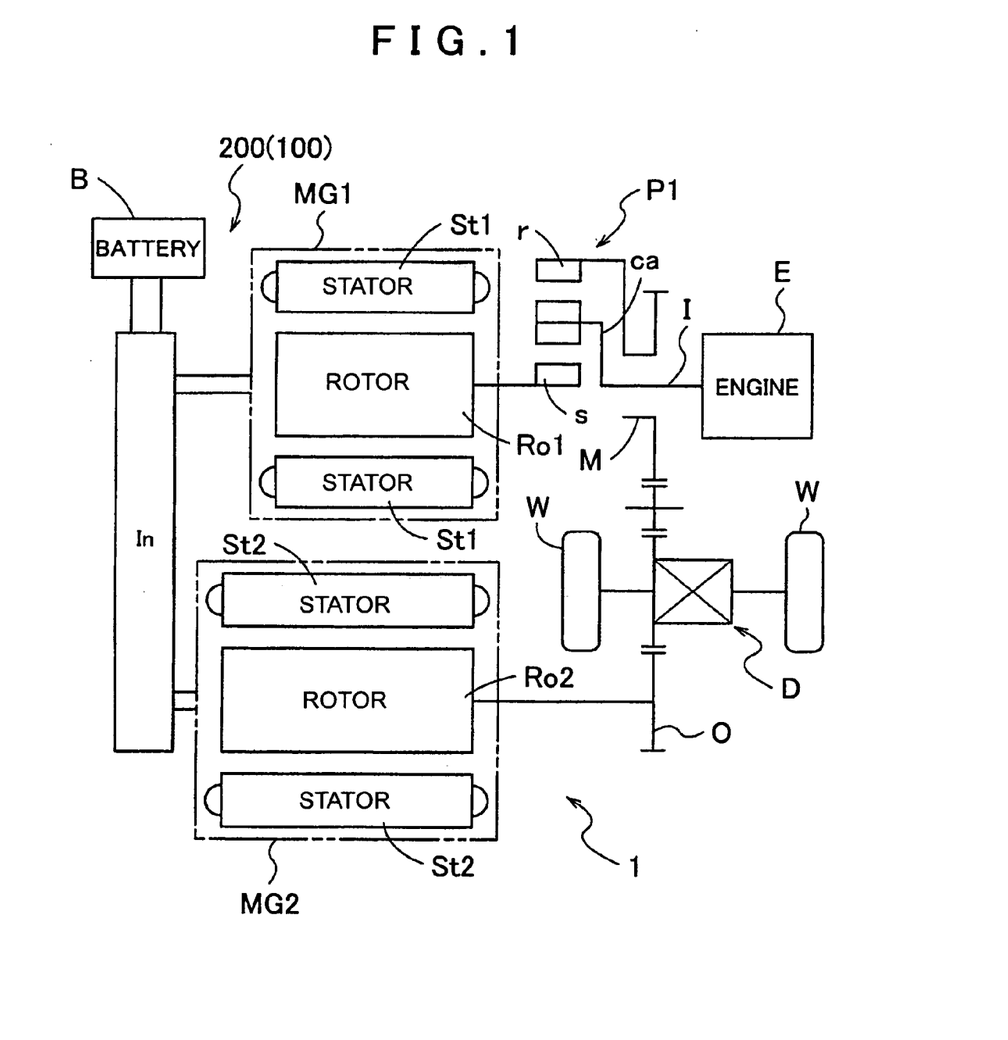
FIG. 1 is a block diagram schematically showing a structure of a drive system of a vehicle drive system.
Figure 2:
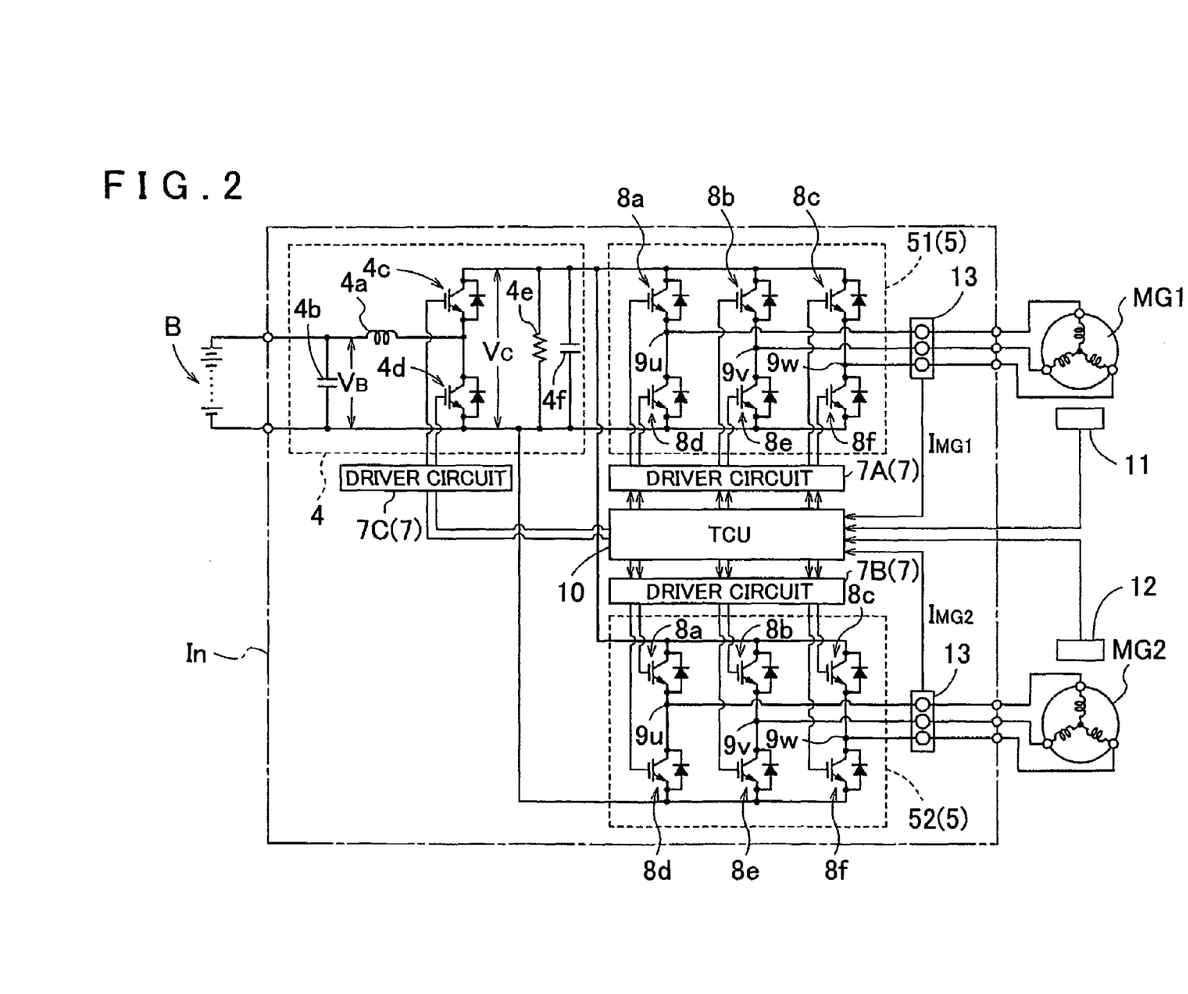
FIG. 2 is a block diagram schematically showing a structure of a rotating electrical machine control system.

Hereinafter, an embodiment of a rotating electrical machine control system according to the present invention will be described with reference to the accompanying drawings. The rotating electrical machine control system is incorporated in a vehicle drive system, and functions to control operation of rotating electrical machines included in the vehicle drive system. FIG. 1 is a block diagram schematically showing a structure of a drive system of a vehicle drive system 200, and FIG. 2 is a block diagram schematically showing a structure of a rotating electrical machine control system having, as a main component, a rotating electrical machine drive device In provided to control rotating electrical machines MG1, MG2. The rotating electrical machine drive device In corresponds to a rotating electrical machine control system of the present invention.

As shown in FIG. 1, a vehicle includes an engine E as an internal combustion engine, and the pair of rotating electrical machines MG1, MG2. The vehicle drive system 200 is a so-called hybrid system, and includes a hybrid drive device 1 between the engine E and wheels W. Various known internal combustion engines, such as a gasoline engine and a diesel engine, can be used as the engine E. As described below, the rotating electrical machines MG1, MG2 operate as a motor (electric motor) or a generator (electric generator). Thus, in the following description, reference characters MG1, MG2 are sometimes omitted unless any of the rotating electrical engines needs to be specified. The vehicle is capable of running with a driving force obtained from the rotating electrical machine serving as a motor or from the engine E. At least a part of the driving force generated by the engine E is converted to electric power in the rotating electrical machine serving as a generator, and is supplied to charge a battery B or to drive the rotating electrical machine serving as a motor. Moreover, during a braking operation, the rotating electrical machine can use the braking force to generate electric power so as to regenerate the electric power to the battery B.

An input shaft I of the hybrid drive device 1 is connected to an output rotary shaft such as a crankshaft of the engine E. Note that it is also preferable to connect the input shaft I to the output rotary shaft of the engine E through a damper, a clutch, and the like. The output of the hybrid drive device 1 is transmitted to the wheels W through a differential unit D and the like. The input shaft I is further connected to a carrier ca of a power distribution mechanism P1, and an intermediate shaft M connected to the wheels W through the differential unit D is connected to a ring gear r.

The first rotating electrical machine MG1 has a stator St1, and a rotor Ro1 rotatably supported radially inside the stator St1. The rotor Ro1 of the first rotating electrical machine MG1 is connected so as to rotate integrally with a sun gear s of the power distribution mechanism P1. The second rotating electrical machine MG2 has a stator St2, and a rotor Ro2 rotatably supported radially inside the stator St2. The rotor Ro2 of the second rotating electrical machine MG2 is connected so as to rotate integrally with an output gear O, and is connected to an input side of the differential unit D.

As shown in FIG. 1, the first rotating electrical machine MG1 and the second rotating electrical machine MG2 are electrically connected to the battery (DC power source) B through the rotating electrical machine drive device (inverter device) In. The first rotating electrical machine MG1 and the second rotating electrical machine MG2 are structured so as to be able to function as a motor (electric motor) supplied with electric power for generating motive power, and as a generator (electric generator) supplied with motive power for generating electric power.

In the structural example of the present embodiment, the first rotating electrical machine MG1 mainly functions as a generator for generating electric power by a driving force received through the sun gear s of the power distribution mechanism P1, and serves to charge the battery B or to supply electric power for driving the second rotating electrical machine MG2. However, the first rotating electrical machine MG1 may function as a motor during high-speed running of the vehicle and the like. On the other hand, the second rotating electrical machine MG2 mainly functions as a motor for assisting a driving force for running the vehicle. During deceleration of the vehicle and the like, the second rotating electrical machine MG2 functions as a generator for regenerating an inertia force of the vehicle as electric energy. Such an operation of the first rotating electrical machine MG1 and the second rotating electrical machine MG2 is controlled by a TCU (trans-axle control unit) 10 (see FIG. 2). The TCU 10 functions as a control portion of the present invention, and controls the rotating electrical machines MG1 and MG2 through a voltage converting portion 4 and a frequency converting portion 5 as described below.

As shown in FIG. 1, the power distribution mechanism P1 is formed by a single-pinion type planetary gear mechanism positioned coaxially with the input shaft I. That is, the power distribution mechanism P1 has the following elements as rotary elements: the carrier ca supporting a plurality of pinion gears; and the sun gear s and the ring gear r each meshing with the pinion gears. The sun gear s as a first rotary element is connected so as to rotate integrally with the rotor Ro1 of the first rotating electrical machine MG1. The carrier ca as a second rotary element is connected so as to rotate integrally with the input shaft I connected to the output rotary shaft of the engine E. The ring gear r as a third rotary element is connected so as to rotate integrally with the intermediate shaft M. The ring gear r is connected to the differential unit D through the intermediate shaft M.

In the structure of FIG. 1, the first rotating electrical machine MG1 is connected to the sun gear s as the first rotary element, and the engine E as a driving source other than the rotating electrical machines MG1 and MG2 is connected to the carrier ca as the second rotary element. The second rotating electrical machine MG2 and the ring gear r as the third rotary element are connected to the wheels W through the differential unit D. However, the structure of the drive system is not limited to this structure. The second rotating electrical machine MG2 may be directly connected to the differential unit D, or may be connected to the third rotary element or another drive transmission element, and connected to the differential unit D through the rotary element or the drive transmission element.

FIG. 2 is a block diagram schematically showing a structure of the rotating electrical machine control system having the rotating electrical machine drive device In as a main component. This rotating electrical machine control system includes the battery B, the rotating electrical machines MG1, MG2, and the rotating electrical machine drive device In interposed between the battery B and the rotating electrical machines MG1, MG2. The rotating electrical machine drive device In includes the voltage converting portion (converter) 4 and the frequency converting portion (inverter) 5, sequentially from the battery B side. As shown in FIG. 2, in the present embodiment, frequency converting portions 51, 52 are separately provided for the pair of rotating electrical machines MG1, MG2 as the frequency converting portion 5. Current sensors 13 for measuring a current flowing in the respective rotating electrical machines are provided between the frequency converting portion 5 and each rotating electrical machine MG1, MG2. Note that this example shows the structure of measuring three phases of current. However, since the three phases are in an equilibrium state, and the sum of respective instantaneous values is zero, it is also possible to measure only two phases of current and to obtain the remaining one phase of current by computation in the TCU 10. Note that the battery B is capable of supplying electric power to the rotating electrical machines MG1, MG2, and is capable of accumulating electric power supplied from the rotating electrical machines MG1, MG2.

The voltage converting portion 4 has a reactor 4a, a filter capacitor 4b, a pair of upper and lower switching elements 4c, 4d, a discharging resistor 4e, and a smoothing capacitor 4f. IGBTs (insulated gate bipolar transistors) or MOSFETs (metal oxide semiconductor field effect transistors) are preferably used as the switching elements 4c, 4d. The present embodiment shows an example using IGBTs.

An emitter of the upper-stage switching element 4c of the voltage converting portion 4 is connected to a collector of the lower-stage switching element 4d, and is connected to a positive side of the battery B through the reactor 4a. A collector of the upper-stage switching element 4c is connected to a positive input side of the frequency converting portion 5. An emitter of the lower-stage switching element 4d is connected to a negative side (ground) of the battery B. Since a negative input side of the frequency converting portion 5 is also grounded, the emitter of the lower-stage switching element 4*d* is connected to the negative input side of the frequency converting portion 5.

Respective gates of the upper-stage switching element 4*c* and the lower-stage switching elements 4*d* are connected to the TCU 10 through a driver circuit 7 (7C). The switching elements 4*c*, 4*d* are controlled by the TCU 10 to boost a voltage from the battery B to supply the boosted voltage to the frequency converting portion 5. The TCU 10 controls the switching elements 4*c*, 4*d* based on a boost command value which is set according to a target torque of the rotating electrical machines. More specifically, the TCU 10 boosts the voltage of the battery B and outputs the boosted voltage by turning off the upper-stage switching element 4*c*, while turning on or off the lower-stage switching element 4*d* by, e.g., PWM control. On the other hand, when the rotating electrical machine performs a regenerative operation, the voltage converting portion 4 regenerates electric power generated by the rotating electrical machine to the battery B. For example, the TCU 10 regenerates electric power through the voltage converting portion 4 by turning off the lower-stage switching element 4*d* and turning on the upper-stage switching element 4*c*. Note that the upper-stage switching element 4*c* may be PWM-controlled in the case where electric power generated by the rotating electrical machine is down-converted and regenerated to the battery B.

The frequency converting portion 5 is formed by a bridge circuit. Two switching elements are connected in series between the positive input side and the negative input side of the frequency converting portion 5, and three of this series circuit are connected in parallel. That is, the bridge circuit is structured so that three sets of series circuits respectively correspond to U-phase, V-phase, and W-phase stator coils of the rotating electrical machines MG1, MG2. In FIG. 2, reference character 8*a* indicates a U-phase upper-stage switching element,
reference character 8*b* indicates a V-phase upper-stage switching element,
reference character 8*c* indicates a W-phase upper-stage switching element,
reference character 8*d* indicates a U-phase lower-stage switching element,
reference character 8*e* indicates a V-phase lower-stage switching element, and
reference character 8*f* indicates a W-phase lower-stage switching element. Note that it is preferable to use IGBTs or MOSFETs as the switching elements 8*a* through 8*f* of the frequency converting portion 5. The present embodiment shows an example using IGBTs.

As shown in FIG. 2, respective collectors of the upper-stage switching elements 8*a*, 8*b*, 8*c* of each phase are connected to a positive output side of the voltage converting portion 4 (the positive input side of the frequency converting portion 5), and respective emitters thereof are connected to respective collectors of the lower-stage switching elements 8*d*, 8*e*, 8*f* of each phase, respectively. Respective emitters of the lower-stage switching elements 8*d*, 8*e*, 8*f* of each phase are connected to a negative output side of the voltage converting portion 4 (the negative input side of the frequency converting portion 5), that is, the negative side (ground) of the battery B. Respective gates of the switching elements 8*a* through 8*f* are connected to the TCU 10 through a driver circuit 7 (7A, 7B), and are independently switching-controlled.

Respective intermediate points (connection points of the switching elements) 9*u*, 9*v*, 9*w* of the series circuits formed by the pairs of switching elements (8*a*, 8*d*), (8*b*, 8*e*), (8*c*, 8*f*) of each phase are connected to the U-phase, V-phase, and W-phase stator coils of the rotating electrical machines MG1 and MG2, respectively. A driving current supplied to each coil is detected by the corresponding current sensor 13. The detected value of the current sensor 13 is supplied to the TCU 10, and used for feedback control.

Each rotating electrical machine MG1, MG2 includes a rotation detecting sensor 11, 12 such as a resolver functioning as a part of a rotation detecting portion, for detecting the rotating angle (mechanical angle) of the corresponding rotor Ro1, Ro2. Each rotation detecting sensor 11, 12 is set according to the number of poles (the number of pole pairs) of the corresponding rotor Ro1, Ro2, and is also capable of converting the rotation angle of the rotor Ro1, Ro2 to an electric angle θ, and outputting a signal according to the electric angle θ. The TCU 10 computes the respective rotation speeds (angular velocities ω) of the rotating electrical machines MG1 and MG2 and the control timing of each switching element 8*a* through 8*f* of the frequency converting portion 5, based on the respective rotation angles.

The TCU 10 supplies a three-phase AC (alternating current) driving current to each rotating electrical machine MG1, MG2 by PWM-controlling the switching elements 8*a* through 8*f* based on the target torque and the rotational speed (the number of revolutions) of the rotating electrical machines MG1, MG2. Each rotating electrical machine MG1, MG2 is thus powered according to the target torque. In the case where the rotating electrical machines MG1 and MG2 serve as generators and the TCU 10 receives electric power from the rotating electrical machines, the TCU 10 controls the frequency converting portion 5 so as to covert an AC of a predetermined frequency to a DC.

Figure 3:
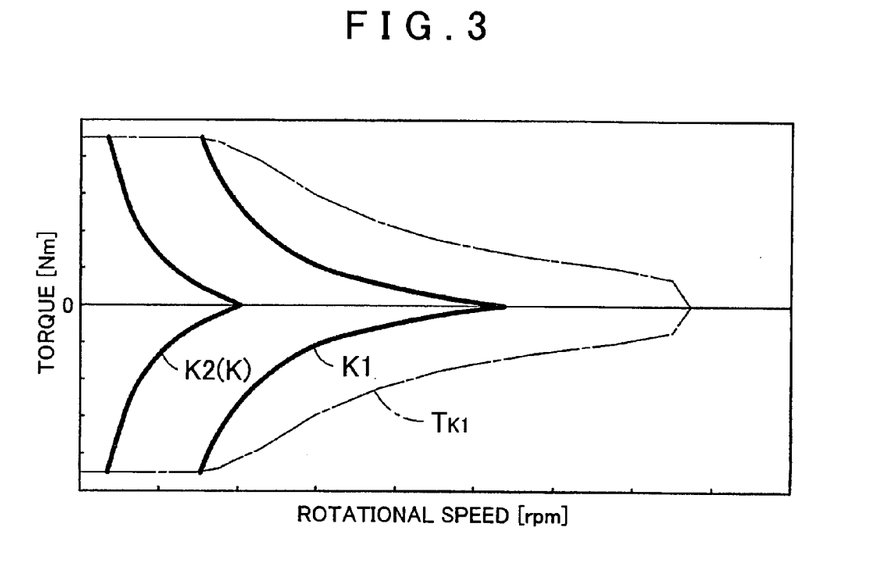
FIG. 3 is a correlation diagram between the rotational speed and the torque of a rotating electrical machine.

FIG. 3 is a correlation diagram between the rotational speed and the torque of the rotating electrical machines. As described above, the rotating electrical machine drive device In includes the voltage converting portion 4, and is capable of boosting the DC voltage of the battery B. That is, the rotating electrical machine drive device In boosts the voltage of the battery B for supplying driving electric power to the rotating electrical machines, in order to shift the rotational speed and the torque at which shifting to the field-weakening control is performed to a higher rotational speed and a higher torque. Reference character K2 (K) in the drawing indicates a shift boundary for starting a boosting operation by the voltage converting portion 4. As can be seen from FIG. 3, the shift boundary K2 (K) is set based on the correlation between the target torque and the rotational speed of the rotating electrical machines.

When at least one of the absolute rotational speed and the absolute target torque of the rotating electrical machines is larger than the shift boundary K2, the voltage converting portion 4 boosts the output of the battery B. A boost command value, which is a boost target value, may be set stepwise or steplessly as a boosted voltage value. Reference character K1 in the drawing indicates a boundary for setting the maximum boost command value, and reference character $T_{K1}$ indicates a torque region that can be output from the rotating electrical machines when a boosting operation is performed based on the boost command value.

The TCU 10 shifts the control state of the voltage converting portion 4 on the condition that the target torque and the rotational speed of the rotating electrical machines exceed the shift boundary K2. More specifically, the TCU 10 performs a control to shift the control state of the voltage converting portion 4 from the non-boost control, in which the output of the battery B is supplied to the frequency converting portion 5 through the voltage converting portion 4 without being boosted, to the boost control, in which the output of the battery B is boosted by the voltage converting portion 4 and supplied to the frequency converting portion 5. When this boosting operation is started, that is, when the shift boundary K2 is exceeded, the power consumption transiently increases due to the dead time of the voltage converting portion 4, and the response delay of the feedback control including the TCU 10. As described above, the voltage converting portion 4 has the reactor 4a having its one end connected to the battery B, the upper-stage switching element 4c connecting the other end of the reactor 4a and the positive side of the frequency converting portion 5, and the lower-stage switching element 4d connecting the other end of the reactor 4a and the negative side of the frequency converting portion 5. When shifting from the non-boost control to the boost control, the dead time in which both the upper-stage switching element 4c and the lower-stage switching element 4d are turned off is provided, which causes a transient increase in power consumption.

Figure 4:
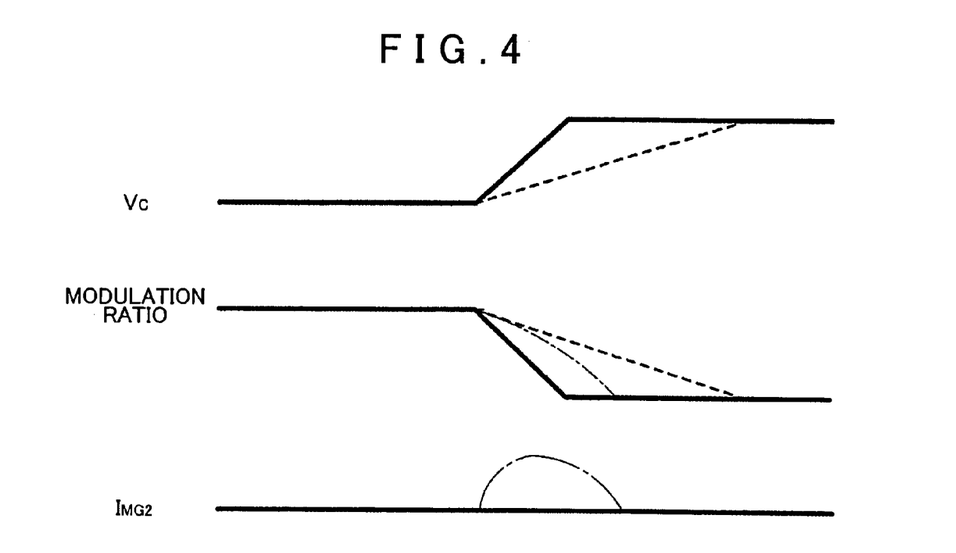
FIG. 4 is an illustration showing a transient phenomenon at the beginning of a boosting operation.
Figure 5:
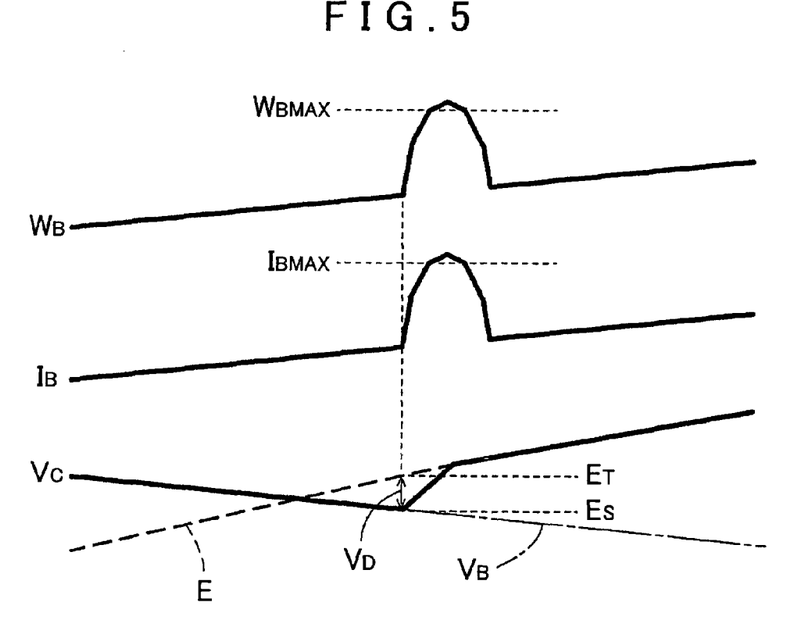
FIG. 5 is an illustration showing a transient phenomenon at the beginning of a boosting operation.

A transient increase in power consumption which occurs when a boosting operation is started, that is, when the shift boundary K2 is exceeded, will be described below. FIGS. 4 and 5 are illustrations showing a transient phenomenon at the beginning of the boosting operation. A waveform schematically shown at the top of FIG. 4 indicates a voltage $V_C$ boosted by the voltage converting portion 4. A waveform schematically shown in the middle. of FIG. 4 indicates a modulation ratio of the frequency converting portion 5. A waveform schematically shown at the bottom of FIG. 4 indicates a current ($I_{MG1}$, $I_{MG2}$) of the rotating electrical machines.

In the dead time described above, both switching elements 4c, 4d of the voltage converting portion 4 are turned off, and thus, the boosting operation cannot be performed. Therefore, the boosting operation cannot be performed in a predetermined voltage range according to an individual system in a situation in which the boost target value is increasing. After the dead time has passed and the control state is shifted from the non-boost control to the boost control, the output of the voltage converting portion 4 rapidly and significantly increases beyond this voltage range. The rotating electrical machine drive device In includes a not-shown voltage sensor, which measures the voltage $V_B$ of the battery B and the voltage $V_C$ boosted by the voltage converting portion 4, and the TCU 10 obtains the measurement result. At this time, the TCU 10 may not be able to accurately obtain the value of the rapidly increasing voltage $V_C$ due to hardware filtering, software filtering, sampling intervals according to the operating clock of the TCU 10, and the like. In other words, although the voltage $V_C$ is actually rapidly increasing as schematically shown by solid line at the top of FIG. 4, the TCU 10 detects that the voltage $V_C$ is gradually increasing as shown by broken line in FIG. 4.

The TCU 10 computes the modulation ratio for conversion into the AC, according to the obtained voltage $V_C$, that is, the DC voltage value on the input side of the frequency converting portion 5. More specifically, the TCU 10 computes a PWM control duty. Since the TCU 10 has recognized the voltage $V_C$ as a value lower than the actual value, the TCU 10 calculates a higher modulation ratio than a required modulation ratio, and PWM-controls the frequency converting portion 5 according to the calculated modulation ratio. Although the modulation ratio actually needs to be reduced rapidly as schematically shown by solid line in the middle of FIG. 4, the modulation ratio is gradually reduced as shown by broken line in FIG. 4.

As a result, the rotating electrical machines are driven by receiving excessive electric power with respect to the target torque, and a motor current flowing in the rotating electrical machine (e.g., a motor current $I_{MG2}$ of the second rotating electrical machine MG2) increases. In other words, a ripple-shaped transient current is generated as schematically shown by chain line at the bottom of FIG. 4. The current flowing in the rotating electrical machine is measured by the current sensor 13, and the measurement result is applied to the TCU 10. The modulation ratio is then adjusted by feedback control as schematically shown by chain line in the middle of FIG. 4. However, generation of the transient current cannot be completely suppressed due to the delay time caused by such voltage and current measurement, and the response delay of the feedback control by the TCU 10.

Since this transient current is drawn from the battery B, an allowable current that can be output from the battery B may be exceeded under the conditions of large power consumption, such as the case where the rotating electrical machines are rotating under high load, resulting in occurrence of an overcurrent.

A waveform schematically shown at the top of FIG. 5 indicates electric power $W_B$ of the battery B, a waveform schematically shown in the middle indicates a current $I_B$ of the battery B, and a waveform schematically shown at the bottom indicates a boosted voltage $V_C$. Since the ripple-shaped transient current is drawn from the battery B as described above, a ripple is produced also in the current $I_B$ of the battery B. As a matter of course, a ripple is produced also in the electric power $W_B$ of the battery B. When the rotating electrical machines are being driven under high load, and the current ($I_{MG1}$, $I_{MG2}$) of the rotating electrical machines is increasing, the current $I_B$ of the battery B also increases. The voltage $V_B$ of the battery B decreases with increase in current $I_B$ of the battery B. In the non-boost control, the output voltage $V_C$ of the voltage converting portion 4 is the battery voltage $V_B$. Therefore, the output voltage $V_C$ of the voltage converting portion 4 also decreases with increase in current $I_B$ of the battery B, as shown at the bottom of FIG. 5.

On the other hand, it is now assumed that the boost command value of the voltage converting portion 4 is determined according to the rotational speed and the target torque of the rotating electrical machines, and the boost command value is a boost target value E after a boosting operation. When the rotating electrical machines are being driven under high load, the boost target value E also tends to increase. Therefore, the boost target value E exceeds the output voltage $V_C$ of the voltage converting portion 4 at time t, and the voltage converting portion 4 starts its boosting operation.

At this time, dead time DT is provided in order to reliably prevent short-circuit of the voltage converting portion 4, as described above. Therefore, if the on-time of the switching elements of the voltage converting portion 4 is shorter than the dead time DT, the switching elements cannot be actually switched, and the voltage converting portion 4 cannot perform a boosting operation. When the difference between the battery voltage $V_B$ and the boost target value E increases by a predetermined non-boostable voltage $V_D$, switching is actually started as the on-time of the switching elements becomes longer than the dead time DT. As a result, after the difference between the battery voltage $V_B$ and the boost target value E becomes larger than the non-boostable voltage $V_D$, the battery voltage is rapidly boosted by an amount including the non-boostable voltage $V_D$, whereby the boosted voltage $V_C$ increases rapidly. A battery overcurrent occurs when the current $I_B$ of the battery B including a ripple current generated by this rapid voltage increase exceeds an upper limit (allowable current $I_{BMAX}$) of the current of the battery B.

In order to suppress shifting to the field-weakening control, the boost target value E and the non-boostable voltage $V_D$ at the shift boundary K2 for boosting the voltage $V_B$ of the battery B have predetermined values according to the system configuration of the rotating electrical machine drive device In. Thus, the voltage $V_B$ of the battery B when shifting from the non-boost control to the boost control also has an approximately fixed value. Therefore, the upper limit, that is, the allowable value, can be defined by the electric power $W_B$ of the battery (allowable electric power $W_{BMAX}$). Thus, if the battery electric power $W_B$ is controlled so as not to exceed the allowable electric power $W_{BMAX}$ when the voltage $V_C$ increases rapidly, the current $I_B$ of the battery B does not exceed the allowable current $I_{BMAX}$, and the overcurrent of the battery B can be suppressed. A technique of suppressing the overcurrent of the battery B will be described below.

Figure 6:
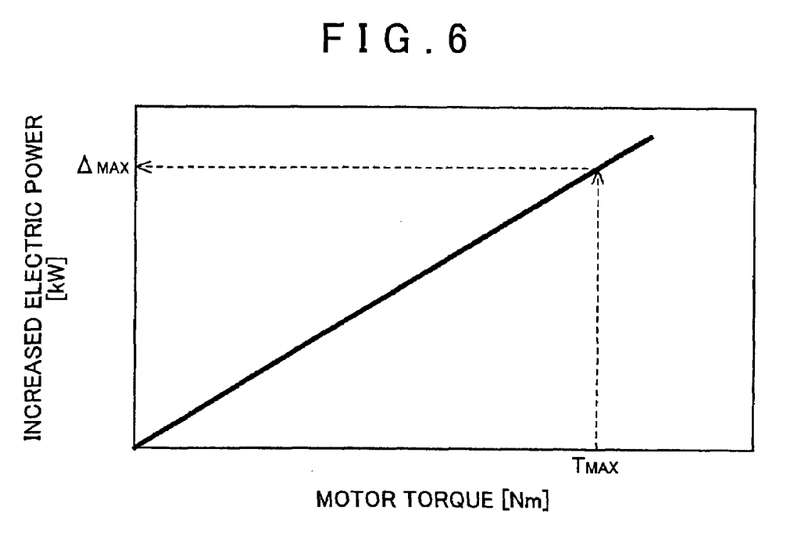
FIG. 6 is a correlation diagram between the torque of rotating electrical machines and the increased electric power.

First, a maximum value of increased electric power ($\Delta$) is measured. Since the value of the increased electric power varies according to the torque of the rotating electrical machines, the increased electric power is measured with respect to a plurality of torques. FIG. 6 is a correlation diagram between the torque of the rotating electrical machines and the increased electric power, showing the measurement result. As can be seen from FIG. 6, the increased electric power increases with increase in torque. Thus, the increased electric power corresponding to the maximum torque ($T_{MAX}$) of the rotating electrical machines is the maximum increased electric power ($\Delta_{MAX}$).

Figure 7:
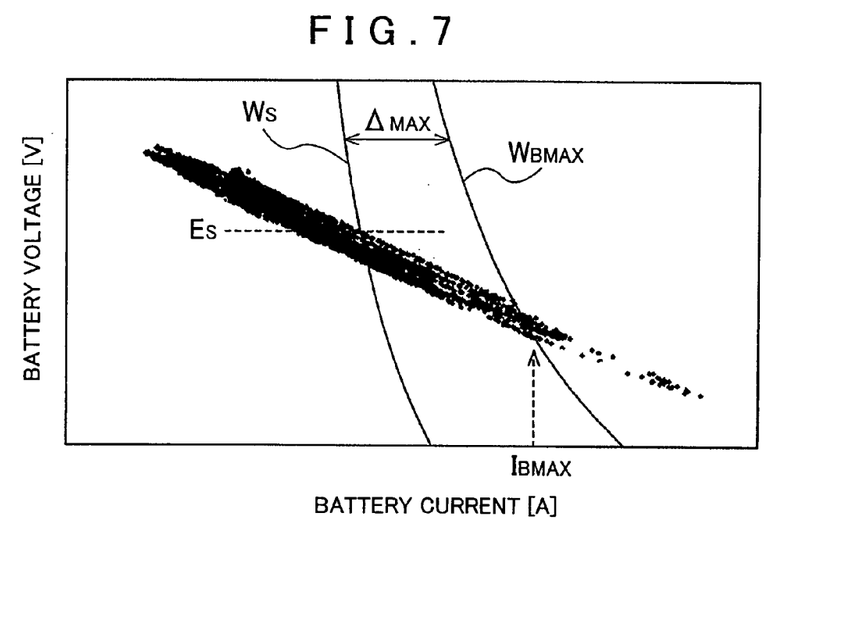
FIG. 7 is a scatter diagram showing V/I characteristics of a DC power source.

Next, the allowable electric power of the battery B is measured. FIG. 7 is a scatter diagram showing the measurement result of V/I characteristics of the battery B. A curve corresponding to the allowable current $I_{BMAX}$ of the battery B as shown on the scatter diagram is the allowable electric power $W_{BMAX}$ of the battery B. The electric power obtained by subtracting the maximum increased electric power ($\Delta_{MAX}$) obtained above, from the allowable electric power $W_{BMAX}$ can be defined as boostable electric power $W_S$.

As described above, the increased electric power ($\Delta$) corresponding to the maximum torque ($T_{MAX}$) of the rotating electrical machines has the maximum value ($\Delta_{MAX}$) among the possible values of the increased electric power. Therefore, the boostable electric power $W_S$ obtained by subtracting the increased electric power ($\Delta$) from the allowable electric power $W_{BMAX}$ becomes the smallest when the target torque has the maximum value ($T_{MAX}$). By setting the shift boundary K based on this boostable electric power $W_S$, generation of the overcurrent of the battery B, associated with the transient voltage increase at the beginning of the boosting operation, can be suppressed in a desirable manner regardless of the magnitude of the target torque.

Moreover, a boost start voltage $E_S$ is obtained from the V/I characteristics of the battery B and the boostable electric power $W_S$. Note that, as described with reference to FIG. 5, when the control state is shifted from the non-boost control to the boost control, that is, at the beginning of the boosting operation, the non-boostable voltage $V_D$ is generated due to the dead time $D_T$. Thus, a boost target voltage $E_T$ which is supposed to be applied as a boost command value to the voltage converting portion 4 is the sum of the boost start voltage $E_S$ and the non-boostable voltage $V_D$.

As shown in FIG. 3, the control state of the voltage converting portion 4 is shifted from the non-boost control to the boost control on the condition that the target torque and the rotational speed of the rotating electrical machines exceed the predetermined shift boundary K2 (K) which is set based on the correlation between the target torque and the rotational speed. If the shift boundary K2 (K) is set in such a region that the power consumption of the rotating electrical machines does not reach the allowable electric power $W_{BMAX}$ even if the increased electric power is generated, the overcurrent of the battery B does not occur when the control state is shifted from the non-boost control to the boost control. In other words, the shift boundary K is set based on the boostable electric power $W_S$, i.e., the electric power obtained by subtracting the increased electric power (e.g., the maximum value $\Delta_{MAX}$) which is transiently produced upon shifting, from the allowable electric power $W_{BMAX}$ which can be output from the battery B, and is set in the region where the power consumption of the rotating electrical machines is equal to or less than the boostable electric power $W_S$.

Figure 8:
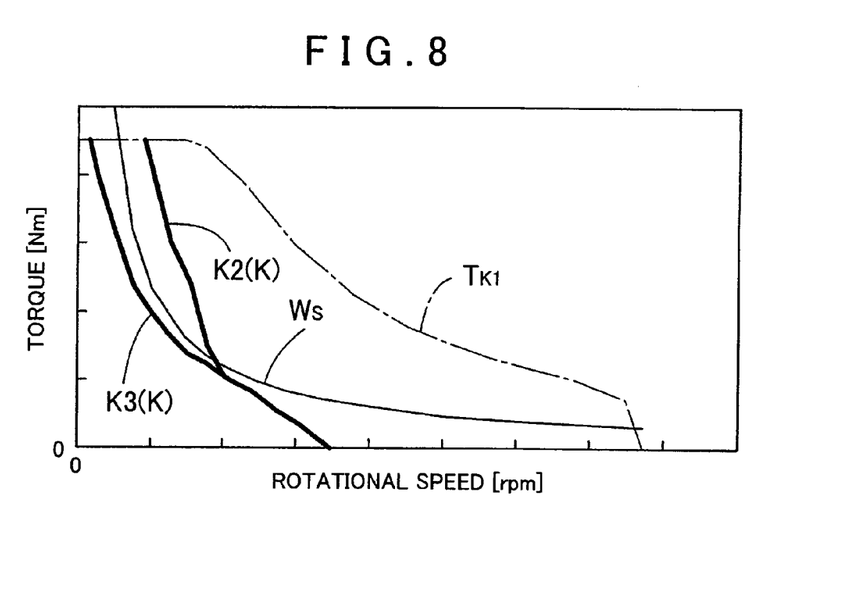
FIG. 8 is an illustration of setting a shift boundary in a correlation diagram between the rotational speed and the torque of the rotating electrical machines.

FIG. 8 is an illustration for setting the shift boundary K in the correlation diagram between the rotation speed and the torque of the rotating electrical machines. Although FIG. 8 corresponds to FIG. 3, FIG. 8 shows only a torque region in a positive direction in order to simplify illustration. In FIG. 8, the shift boundary K2 is a boundary provided to start the boosting operation in order to perform normal field control of the rotating electrical machines without shifting to the field-weakening control and without considering the increased electric power described above. Here, a boundary line corresponding to the boostable electric power $W_S$ is added to the diagram in FIG. 8. In the drawing, a region located on the upper right side of the boundary line corresponding to the boostable electric power $W_S$, that is, the direction in which the torque increases and the direction in which the rotational speed increases, is a region where the power consumption is larger than the boostable electric power $W_S$.

Referring to FIG. 8, the shift boundary K2 is set also in the region where the power consumption is larger than the boostable electric power $W_S$. Therefore, depending on the rotational speed and the target torque of the rotating electrical machines at the beginning of the boosting operation, the battery electric power $W_B$ may exceed the allowable electric power $W_{BMAX}$ of the battery B, and a current exceeding the allowable current $I_{BMAX}$ may be drawn from the battery B, causing an overcurrent. Therefore, a boundary for starting the boosting operation toward the boost target voltage $E_T$ at the beginning of the boosting operation is set as a shift boundary K3 (K) which is set only in a region located on the lower left side of the boundary line corresponding to the boostable electric power $W_S$ in the drawing. In other words, the shift boundary K3 (K) is set based on the boostable electric power $W_S$, i.e., the electric power obtained by subtracting the increased electric power (e.g., the maximum value $\Delta_{MAX}$) which is generated transiently upon shifting, from the allowable electric power $W_B$ MAX which can be output from the battery B, and is set in the region where the power consumption of the rotating electrical machines is equal to or less than the boostable electric power $W_S$.

Figure 9A:
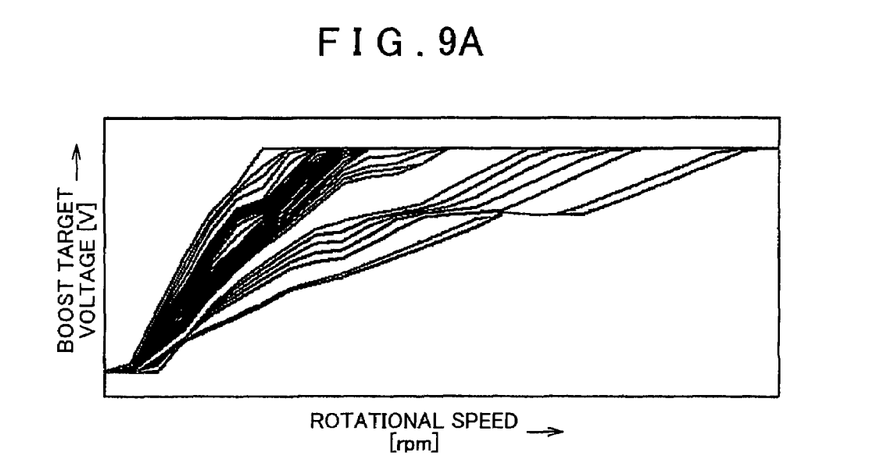
FIGS. 9A and 9B show graphs showing boost target voltages for each target torque.
Figure 9B:
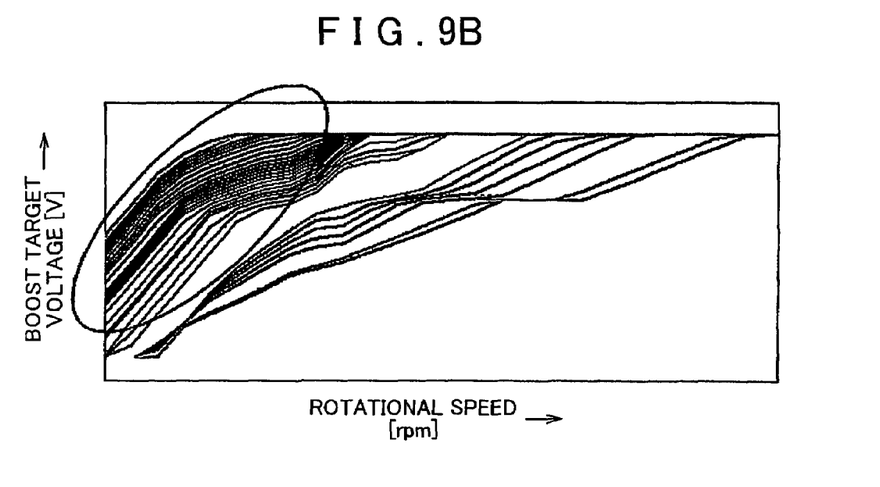

FIGS. 9A and 9B are graphs showing the boost target voltages $E_T$ for each target torque. A plurality of curves are shown in the drawing in the order of the magnitude of the target torque: the target torque becomes smaller toward the right, and becomes larger toward the left. FIG. 9A shows a case where the shift boundary K2 in FIG. 8 is applied, and FIG. 9B shows a case where the shift boundary K3 in FIG. 8 is applied. As shown in FIG. 8, the shift boundaries K2 and K3 have the same curve in a region where the target torque is low. Thus, the shift boundaries K2 and K3 have the same curves on the right side of FIGS. 9A and 9B. On the other hand, as shown in FIG. 8, the shift boundaries K2 and K3 have different curves in a region where the target torque is high. It can be seen from FIGS. 9A and 9B that the boost target voltage $E_T$ of FIG. 9B has a higher voltage value than that of FIG. 9A on the left side of FIGS. 9A and 9B, especially in a region surrounded by an oval in FIG. 9B.

As the load on the rotating electrical machines increases and the power consumption of the rotating electrical machines increases, the current $I_B$ to be drawn from the battery B increases, and the voltage $V_B$ of the battery B decreases. In this case, the decreasing voltage $V_B$ of the battery B (the output voltage $V_C$ of the voltage converting portion 4 before the boosting operation is started) becomes lower than the boost target voltage $E_T$ at an earlier timing by increasing the boost target voltage $E_T$. In other words, the boosting operation is started when the voltage $V_B$ of the battery B (the output voltage $V_C$ of the voltage converting portion 4) has a higher value than that in conventional examples. That is, the boosting operation is started while the power consumption is still lower than the allowable electric power even if the increased electric power ($\Delta$) is included. Therefore, the overcurrent of the battery B due to the increased electric power does not occur even if the boosting operation is started in a situation of large power consumption.

OTHER EMBODIMENTS (1) The above embodiment has been described with respect to an example in which the shift boundary K3 is set according to the maximum value $T_{MAX}$ of the target torque. In other words, the boostable electric power $W_S$ is set to a value obtained by subtracting the increased electric power (the maximum value $\Delta_{MAX}$) produced when the target torque has the maximum value ($T_{MAX}$) from the allowable electric power $W_{BMAX}$, and the shift boundary K3 is set in a region where the power consumption of the rotating electrical machines becomes equal to or lower than the boostable electric power $W_S$. However, different shift boundaries K may be set according to the target torques.

In other words, electric power obtained by subtracting the increased electric power generated for one target torque from the allowable electric power $W_{BMAX}$ may be set as the boostable electric power $W_S$ corresponding to this target torque, and the shift boundary K may be set in a region where power consumption of the rotating electrical machines at this target torque becomes equal to or less than the boostable electric power $W_S$. As shown in FIG. 6, the increased electric power increases as the target torque increases. Thus, the shift boundary K is preferably set to a lower electric power side as the target torque becomes higher. More specifically, the boostable electric power $W_S$ can be set so that the boostable electric power $W_S$ increases as the target torque decreases, while the minimum boostable electric power $W_S$ is set to electric power obtained by subtracting the maximum increased electric power ($\Delta_{MAX}$) generated when the target torque has the maximum value ($T_{MAX}$), from the allowable electric power $W_{BMAX}$.

(2) The above embodiment has been described with respect to an example in which a vehicle is a hybrid vehicle including rotating electrical machines as a drive source, and a drive source (engine) other than the rotating electrical machines. However, the present invention is intended for systems including rotating electrical machines which are drivingly controlled by a rotating electrical machine drive device having a voltage converting portion. Therefore, the systems may include only the rotating electrical machines as a drive source, and the present invention may also be applied to electric vehicles having rotating electrical machines as a drive source.

(3) The above embodiment has been described with respect to an example in which a hybrid vehicle includes a pair of rotating electrical machines, one of which serves as a motor and the other serves as a generator. However, the present invention may also be applied to any hybrid vehicle including a single rotating electrical machine, and having operation modes in which this single rotating electrical machine serves as a motor and a generator.

The present invention may be applied to a rotating electrical machine control system that includes a power supply converting portion for boosting an output of a DC power source, and that controls a rotating electrical machine for driving a vehicle. The present invention may further be applied to a vehicle drive system including the rotating electrical machine control system. For example, the present invention may be applied to electric cars which are driven by a motor as a rotating electrical machine, and hybrid cars which are driven by an internal combustion engine and a motor.

What is claimed is:

1. A rotating electrical machine control system, comprising:
   a frequency converting portion that is interposed between a rotating electrical machine for driving a vehicle and a DC power source for supplying electric power to the rotating electrical machine, and that converts an output of the DC power source to an AC output at least during a powering operation of the rotating electrical machine;
   a voltage converting portion that is interposed between the DC power source and the frequency converting portion, and that boosts the output of the DC power source based on a boost command value which is set according to a target torque and a rotational speed of the rotating electrical machine; and
   a control portion for controlling the frequency converting portion and the voltage converting portion, wherein
   when the control portion performs a control to shift a control state from non-boost control, in which the output of the DC power source is supplied to the frequency converting portion through the voltage converting portion without being boosted, to boost control, in which the output of the DC power source is boosted by the voltage converting portion and then supplied to the frequency converting portion, on a condition that the target torque and the rotational speed of the rotating electrical machine exceed a predetermined shift boundary which is set based on a correlation between the target torque and the rotational speed of the rotating electrical machine, boostable electric power, which is electric power obtained by subtracting increased electric power transiently produced during the shifting, from allowable electric power output from the DC power source, is used as reference electric power, and the shift boundary is set in a region where power consumption of the rotating electrical machine is equal to or lower than the boostable electric power.

2. The rotating electrical machine control system according to claim 1, wherein
   the shift boundary is set according to a maximum value of the target torque.

3. The rotating electrical machine control system according to claim 2, wherein
   the boostable electric power is set as electric power obtained by subtracting the increased electric power generated when the target torque has a maximum value, from the allowable electric power.

4. The rotating electrical machine control system according to claim 1, wherein
   the shift boundary is set to a lower electric power side as the target torque increases.

5. The rotating electrical machine control system according to claim 4, wherein the boostable electric power is set to a higher value as the target torque decreases, while electric power obtained by subtracting the increased electric power generated when the target torque has a maximum value, from the allowable electric power is set as a minimum value of the boostable electric power.

6. The rotating electrical machine control system according to claim 1, wherein the voltage converting portion includes a reactor having a first end connected to the DC power source, an upper-stage switching element connecting a second end of the reactor and a positive side of the frequency converting portion, and a lower-stage switching element connecting the second end of the reactor and a negative side of the frequency converting portion, and the increased electric power is transiently produced upon shifting from the non-boost control to the boost control due to a dead time during which both the upper-stage switching element and the lower-stage switching element are controlled to be turned off.

7. A vehicle drive system, comprising:

the rotating electrical machine control system according to claim 1;

a first rotating electrical machine and a second rotating electrical machine as the rotating electrical machine; and a power distribution mechanism for distributing a driving force generated from a drive source other than the first rotating electrical machine and the second rotating electrical machine, wherein one of the driving force distributed by the power distribution mechanism is transmitted to a wheel, another one of the driving force distributed by the power distribution mechanism is transmitted to the first rotating electrical machine, and a driving force generated by the second rotating electrical machine is transmitted to the wheel.

8. The vehicle drive system according to claim 7, wherein the power distribution mechanism includes a planetary gear mechanism having a first rotary element, a second rotary element, and a third rotary element in order of a rotational speed, and the first rotating electrical machine is connected to the first rotary element, the drive source other than the rotating electrical machines is connected to the second rotary element, and the second rotating electrical machine and the third rotary element are connected to the wheel.

* * * * *